United States Patent Office 2,858,343
Patented Oct. 28, 1958

2,858,343

PRODUCTION OF 2,2-BISPHENOLIC PROPANE COMPOUNDS

Raymond I. Hoaglin, South Charleston, Charles W. Plummer, Dunbar, and Henry C. Schultze, Charleston, W. Va., assignors to Union Carbide Corporation, a corporation of New York No Drawing. Application November 25, 1955
Serial No. 549,191

11 Claims. (Cl. 260—619)

This invention relates to the production of 2,2-bis-phenolic propane compounds. More particularly, the invention relates to the production of 2,2-bisphenolic propane compounds by the reaction of a monohydric phenol, such as phenol, ortho-cresol, meta-cresol and like compounds with an isopropenyl ester of a lower alkanoic acid, particularly isopropenyl acetate.

Heretofore, one of the processes for making 2,2-bis(4-hydroxyphenyl)propane has been by the condensation of phenol with acetone in the presence of acidic condensation agents such as sulfuric acid and hydrogen chloride. Water, which is a co-product of the reaction, adversely affects the rate of formation of the 2,2-bis(4-hydroxyphenyl)propane. As a result extended reaction periods are necessary for good yields unless expensive dehydration steps are employed. In order to avoid the undesirable features of the acetone process, it has more recently been proposed to employ a saturated dihalide such as 2,2-dichloropropane or an unsaturated monohalide such as 2-chloropropene or a bis(organo-mercapto) methane instead of acetone as a co-reactant with the phenol. But these processes are also characterized by a number of undesirable features such as low yields, poor product quality, undesirable resinification and by-product formation, and in some instances by long reaction periods and extensive methods for the recovery of the 2,2-bis-phenolic propane.

According to our invention, a 2,2-bisphenolic propane is prepared by reacting a monohydric phenol wherein the para position to the phenolic hydroxyl group has only a substitutable hydrogen atom, with an isopropenyl ester of a lower alkanoic acid in the presence of an acidic condensing agent. The reaction scheme of our invention proceeds in the following manner, shown here for purposes of illustration only, using phenol and isopropenyl acetate to produce 2,2-bis(4-hydroxyphenyl)propane and the alkanoic acid by-product.

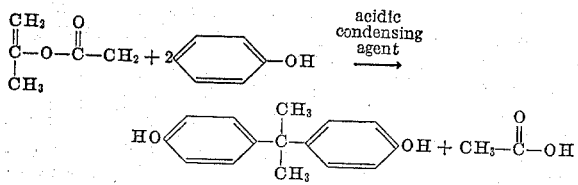

The monohydric phenols which can be employed in this process are phenol and lower mono-alkyl substituted phenols wherein the para position to the phenolic hydroxyl has only a substitutable hydrogen atom, and the alkyl group has from 1 to about 4 inclusive carbon atoms; for example ortho-cresol, meta-cresol, ortho-ethylphenol, meta-ethylphenal, ortho- and meta-propyl-phenol and ortho- and meta-butyl-phenol. Particularly good results are secured using phenol as the phenolic reactant with isopropenyl acetate as the isopropenyl ester to produce the 2,2-bis(4-hydroxyphenyl)propane.

The amount of the monohydric phenol that can be employed is not narrowly critical. While stoichiometric quantities of the reactants can be used, it is preferred that the phenol be in an excess of such an amount. A ratio of about three or more moles of the phenol per mole of isopropenyl ester is particularly preferred.

The isopropenyl esters of lower alkanoic acids, such as acetic, propionic, butyric, valeric, and caproic acids can be employed in this reaction. Of the isopropenyl esters operable in this invention, isopropenyl acetate is particularly preferred. It is readily available and is the least expensive ester, and also, high yields are secured thereby with ease of reaction at moderate temperatures. The function of the isopropenyl ester is, of course, to provide an isopropenyl group for reaction purposes.

Acidic condensing agents found useful for promoting the reaction include the strong mineral acids, such as sulfuric acid and hydrogen chloride, and the Friedel-Crafts type catalysts, particularly boron trifluoride and zinc chloride. Mixtures of two or more acidic condensing agents can be employed. We have found that an amount of the acidic condensing agent of about 0.10 mole or more per mole of isopropenyl ester is effective in promoting the condensation. Our best yields are secured when about one to three moles of acidic condensing agent per mole of isopropenyl ester are used, although greater amounts can be employed without detriment.

The order of addition of the two reactants and acidic condensing agent is not critical. The reaction is conveniently conducted by heating a mixture of the phenolic compound, isopropenyl ester and acidic condensing agent to the reaction temperature, and also by adding the acidic condensing agent to a mixture of the two reactants maintained at the reaction temperature. The addition of the components of the reaction mixture can be continuous, in small successive amounts or all at once as desired. Very good yields are secured when the isopropenyl ester is slowly added to a mixture of the phenol and the acidic condensing agent.

The reaction to produce the 2,2-bisphenolic propane readily proceeds at temperatures from about 25° C. to about 80° C. A temperature between about 40° C. and about 70° C. is preferred. Within this preferred range the phenol is in the liquid state and adequate mixing of the reactants is facilitated for best yields. Control over the reaction is also easily maintained by having the reactants in the liquid phase. According to our experience 2,2-bis(4-hydroxyphenyl)propane, when prepared by the process of this invention, crystallizes as a complex with unreacted phenol at a temperature of about 50° C. or less. By maintaining the phenol in the molten state in reactions performed at less than this temperature, mixing of the reactants is facilitated, although the acidic condensing agent and alkanoic acid liberated in the reaction provide sufficient mixing for the 2,2-bis(4-hydroxyphenyl)propane to form at temperatures as low as 25° C. Increased yields in a completely liquid reaction make such liquid conditions desirable. When aqueous solutions of the acidic condensation agents are employed, it likewise is desirable to conduct the reaction in the liquid state at a temperature of about 40° C. or above. At temperatures above 80° C., by-product reactions involving the phenol and 2,2-bisphenolic propane are favored and thus higher temperatures are not desirable.

It has been found that the presence of minor amounts of water in the reaction mixture of this process does not inhibit the desired formation of the 2,2-bisphenolic propane. While the presence of great amounts of water is not desirable in this reaction, it is possible to use not only aqueous concentrated solutions of certain acidic condensing agents, but also reactants not completely dehydrated before use in this reaction, to an advantage in reducing process costs. However, the presence of water in the reaction is not a critical requirement of the process, as it can readily be conducted with anhydrous reactants and acidic condensing agents with corresponding good yields of the desired 2,2-bisphenolic propane.

According to the reaction scheme herebefore set forth, one of the products of the reaction is the alkanoic acid. In the reaction, some of the alkanoic acid reacts with the unreacted phenol to form the phenyl alkanoate, for example when isopropenyl acetate is used in this reaction, acetic acid reacts with some of the phenol to form a small amount of phenyl acetate. The phenyl acetate is easily reconverted to phenol and acetic acid by known procedures.

Under the preferred conditions of the reaction, yields of 2,2-bis(4-hydroxyphenyl)propane of 65–80 percent are secured in this process, using phenol and isopropenyl acetate in the presence of about three moles of hydrogen chloride in a concentrated aqueous solution as the acidic condensation agent at a reaction temperature of about 70° C. in about two hours. Total efficiencies to the 2,2-bis(4-hydroxyphenyl)propane and to phenyl acetate of 85–90 percent are realized, based on phenol.

The 2,2-bisphenolic propane can be recovered from the reaction mixture in various ways. For the recovery of 2,2-bis(4-hydroxyphenyl)propane, two methods of product recovery are particularly preferred becauce of their simplicity—filtration and distillation. The filtration method is accomplished by filtering from the reaction mixture at a temperature of about 50° C. or less, and preferably at room temperature, a crystalline mixture of phenol and 2,2-bis(4-hydroxyphenyl)propane. This mixture generally contains a crystalline complex formed between phenol and the 2,2-bis(4-hydroxyphenyl)propane and some unassociated unreacted phenol, the latter particularly occurring in crystalline phase at temperatures below 40° C. The unreacted phenol in this crystalline mixture can be removed by washing the mixture with water to dissolve out the phenol or by stripping the mixture under vacuum to drive off the phenol to recover the 2,2-bis-(4-hydroxyphenyl)propane as a residue product. The 2,2-bis(4-hydroxyphenyl)propane can be further purified by washing the residue product with chloroform.

If desired, the entire reaction mixture may be charged to a vacuum distillation column and distilled under vacuum to remove overhead the unreacted phenol, alkanoic acid liberated in the reaction, phenyl alkanoate, volatile acidic condensing agent such as hydrogen chloride if such is employed, and water if present, leaving the 2,2-bis(4-hydroxyphenyl)propane in the residue from this distillation. The 2,2-bis(4-hydroxyphenyl)propane may be further purified by washing the still residue with chloroform. If a non-volatile acidic condensing agent such as zinc chloride is employed, it will, in such a distillation operation, remain as the distillation residue with the 2,2-bis(4-hydroxyphenyl)propane and can be removed by washing such residue with water to leave the substantially pure 2,2-bis(4-hydroxyphenyl)propane in the crystalline form, or this residue may be further distilled under vacuum to recover the pure 2,2-bis(4-hydroxyphenyl)propane as the distillate. Further purification of the 2,2-bis(4-hydroxyphenyl)propane, if such is desired, is readily effected by washing the produce with chloroform.

Other 2,2-bisphenolic propanes are easily separated from the reaction mixture by known means. Solvent extraction and distillation procedures can be advantageously employed.

The process of this invention can be carried out batchwise, in a semi-continuous, or continuous operation if desired. The reactants may be added to a reaction zone in which residence time of reactants is about two hours, and followed by low-temperature stripping under reduced pressure to remove the unreacted phenol, alkanoic acid, phenyl alkanoate, and volatile acidic condensing agent, and recovering the 2,2-bisphenolic propane by washing the residue with water or chloroform. The phenol and acidic condensing agent may be recycled back to the reactor. The process can also be adapted to provide for continuous removal of the crystalline complex of phenol and 2,2-bisphenolic propane, breaking down the complex as hereinbefore described and returning the unreacted phenol to the reactor. Low-temperature stripping in the reaction vessel will remove the alkanoic acid and phenyl alkanoate.

The following examples are further illustrative of the process of this invention.

*Example 1*

To a mixture consisting of 470 grams (five moles) of phenol and 100 grams (one mole) of isopropenyl acetate in a glass reaction vessel equipped with a stirrer, 98 grams (one mole) of concentrated sulfuric acid was added dropwise while stirring. During the addition and for six hours thereafter, the reaction temperature was maintained at 45° C.–50° C. The reaction mixture, after the six hours of reaction, was dissolved in 500 ml. of isopropyl ether, washed free of acid with an aqueous solution of sodium bicarbonate and finally washed once with water to remove the final traces of bicarbonate. The isopropyl ether was stripped from the washed solution and the latter then distilled at 98°–100° C. at a pressure of 35 mm. Hg. There remained in the distillation vessel a residue amounting to 168 grams which, upon washing with 200 grams of chloroform, gave 122 grams of 2,2-bis(4-hydroxyphenyl)propane having a melting point of 150° C.–155° C. Yield of 2,2-bis(4-hydroxyphenyl)propane was 53 percent, based on isopropenyl acetate.

*Example 2*

A slow stream of anhydrous hydrogen chloride was continuously sparged through an agitated solution of 470 grams (five moles) phenol and 100 grams (one mole) isopropenyl acetate in a glass reaction vessel equipped with a stirrer, at a rate of about 0.01 gram per minute for six hours while the reaction was maintained at 45° C. The reaction mixture, containing a considerable amount of crystalline material, was then distilled at 37–95° C. at 30 mm. Hg pressure, removing overhead hydrogen chloride, unreacted phenol, acetic acid, and phenyl acetate. The still residue was washed three times with 100-gram portions of chloroform, and 145 grams of colorless crystalline 2,2-bis(4-hydroxyphenyl)propane having a melting point of 155° C.–158° C. was recovered from the washed residue. Yield was 64 percent based on isopropenyl acetate and 68 percent of the phenol charge was recovered as unreacted phenol and as phenyl acetate.

*Example 3*

To an agitated mixture of 470 grams (five moles) of phenol and 100 grams of 36 percent aqueous solution of hydrogen chloride (one gram mole of HCl), there was added dropwise 100 grams (one mole) of isopropenyl acetate during 30 minutes. The reaction temperature was maintained at 45° C. during the addition and for six hours thereafter. The reaction mixture, containing a considerable amount of crystalline material, was distilled under 28 mm. Hg pressure at 35–96° C. to remove water, acetic acid, hydrogen chloride, unreacted phenol, and phenyl acetate. The distillation residue was washed with three 100-gram portions of chloroform and yielded 152 grams of colorless crystalline 2,2-bis(4-hydroxyphenyl)propane having a melting point of 154–157° C. The yield was 67 percent, based on isopropenyl acetate. Sixty-eight percent of the phenol charged was recovered as phenol and as phenyl acetate.

*Example 4*

A solution consisting of 282 grams (three moles) of phenol, 100 grams (one mole) of isopropenyl acetate, and 300 grams of a 36 percent aqueous solution of hydrogen chloride (3 grams moles of HCl) was agitated at 70° C. for 2.5 hours. Stirring was continued while the reaction mixture was cooled to 25° C. During the cooling procedure copious crystallization of the reaction mixture occurred. The crude crystalline material was separated by filtration and washed with water to remove the phenol from the 2,2-bis(4-hydroxyphenyl)propane. Washing was continued until the melting point of the 2,2-bis(4-hydroxyphenyl)propane had been raised to 151–155° C. A yield of product of 80 percent, based on isopropenyl acetate, was secured.

*Example 5*

A mixture consisting of 188 grams (two moles) of phenol, 100 grams (one mole) of isopropenyl acetate and 200 grams of a 36 percent aqueous solution of hydrogen chloride (two gram moles of HCl) was stirred at 45° C. for six hours and left overnight. Copious crystallization occurred during this time. The crystals were filtered off and washed with water until a melting point of 152–155° C. was attained. The weight of 2,2-bis(4-hydroxyphenyl)propane so obtained was 138 grams. An additional amount thereof was obtained by diluting the original filtrate with water, and washing with chloroform the crystals which separated. The total yield of 2,2-bis(4-hydroxyphenyl)propane was 64 percent of the theoretical, based on either phenol or isopropenyl acetate.

*Example 6*

A mixture of 442 grams (4.7 moles) of phenol and 9.8 grams (0.1 mole) of concentrated sulfuric acid was saturated with anhydrous hydrogen chloride (0.25 mole of HCl). To this solution was slowly added 100 grams (one mole) of isopropenyl acetate, while maintaining the mixture at 45° C. The reaction mixture was then agitated at 45° C. for six hours, during which time about 0.001 mole of anhydrous hydrogen chloride was sparged through the mixture for five minutes every hour. After allowing the mixture to cool to room temperature overnight, the crystals which formed were filtered off and washed first with chloroform and then with water, thereby leaving 139 grams of white crystalline 2,2-bis(4-hydroxyphenyl)propane having a melting point of 157–158° C. Upon distillation of the combined original filtrate and the chloroform washings under reduced pressure of 35 mm. Hg at 92–98° C., 48 percent of the phenol charged was recovered unreacted. Washing of the residue from the distillation with chloroform gave an additional 11 grams of the 2,2-bis(4-hydroxyphenyl)propane. A total yield of 66 percent based on the isopropenyl acetate was secured.

*Example 7*

A mixture of 470 grams (five moles) of phenol and 52 grams (0.38 moles) of zinc chloride was saturated with about 17 grams (0.5 mole) of anhydrous hydrogen chloride. To this mixture was added 100 grams (1 mole) of isopropenyl acetate, while maintaining the mixture at 45° C. A slow stream of anhydrous hydrogen chloride was then sparged through the mixture at a rate of about 0.01 gram per minute for 0.5 hour, while the temperature was kept at 45° C. After an additional 1.5 hours' agitation, the crystals which formed were filtered off and washed with four 200-gram portions of chloroform, and then with five 500-gram portions of water to give 168 grams of 2,2-bis(4-hydroxyphenyl)propane having a melting point of 157.5–158° C. The yield was 74 percent, based on isopropenyl acetate. Forty percent of the phenol charged was recovered by vacuum distillation of the combined original filtrate and the chloroform washings.

*Example 8*

A mixture of 432 grams (4 moles) of meta-cresol and 300 grams of a 36 percent aqueous solution of hydrogen chloride was heated to 50° C. and 100 grams (1 mole) of isopropenyl acetate was added over a twenty minute period. The reaction temperature gradually rose during this addition and was 68° C. at the termination of the addition. The mixture was maintained at 70° C. with stirring for an additional three hours, after which the mixture was cooled to 30° C. and diluted with 500 ml. of water.

The product was recovered by extracting the diluted reaction mixture with five 200 ml. portions of isopropyl ether. The ether extractions were combined and distilled, leaving 130 grams of a brown residue in the still kettle. Crystallization of this residue from methanol gave a product melting at 124–126° C. Recrystallization of this product gave crystals melting at 128.5–129.5° C., which were identified as 2,2-bis(4-hydroxyphenyl)propane. Recorded melting point of this compound is 131–132° C.

*Example 9*

To a mixture of 162 grams (1.5 moles) of ortho-cresol and 150 grams of a 36 percent aqueous solution of hydrogen chloride, there was slowly added 50 grams (0.5 mole) of isopropenyl acetate while stirring. The reaction temperature rose from about 30° C. to 70° C. during the addition and the mixture was maintained at 70° C. for four hours, after which it was cooled to 30° C. and diluted with 100 ml. of water.

The product was recovered by extracting the diluted reaction mixture with 500 ml. of isopropyl ether. The extract was washed with water and the aqueous layer discarded. After drying over sodium sulfate to remove excess water, the extract was distilled, leaving 95 grams of residue in the still kettle. About 0.34 mole of unreacted ortho-cresol was recovered in the distillation. The residue was washed twice with 50 ml. portions of carbon tetrachloride to give 60 grams of white crystals having a melting point of 140°–143° C. This material was ascertained to be 2,2-bis(4-hydroxy-3-methylphenyl)propane by carbon and hydrogen analysis and by molecular weight determination. Yield was 49 percent based on isopropenyl acetate.

We claim:

1. The process for the production of a 2,2-bisphenolic propane which comprises reacting at a temperature within the range from about 25° C. to about 80° C. a monohydric phenol wherein the para position to the phenolic hydroxyl group has only a substitutable hydrogen atom with an isopropenyl ester of a lower alkanoic acid in the presence of an acidic condensing agent present in an amount of at least 0.10 mole per mole of said isopropenyl ester.

2. The process for the production of a 2,2-bisphenolic propane which comprises reacting at a temperature within the range from about 25° C. to about 80° C. a monohydric phenol wherein the para position to the phenolic hydroxyl group has only a substitutable hydrogen atom with isopropenyl acetate in the presence of an acidic condensing agent present in an amount of at least 0.10 mole per mole of said isopropenyl acetate.

3. The process for the production of 2,2-bis(4-hydroxyphenyl)propane which comprises reacting at a temperature within the range from about 25° C. to about 80° C. phenol with an isopropenyl ester of a lower alkanoic acid, in the presence of an acidic condensing agent present in an amount of at least 0.10 mole per mole of said isopropenyl ester.

4. The process for the production of 2,2-bis(4-hydroxy-2-methylphenyl)propane which comprises reacting at a temperature within the range from about 25° C. to about 80° C. meta-cresol with isopropenyl acetate in the presence of an acidic condensation agent present in an amount of at least 0.10 mole per mole of said isopropenyl acetate.

5. The process for the production of 2,2-bis(4-hydroxy-3-methylphenyl)propane which comprises reacting at a temperature within the range from about 25° C. to about 80° C. ortho-cresol with isopropenyl acetate in the presence of an acidic condensation agent present in an amount of at least 0.10 mole per mole of said isopropenyl acetate.

6. The process for the production of 2,2-bis(4-hydroxyphenyl)propane which comprises reacting phenol with isopropenyl acetate in a molar ratio of at least two moles of phenol per mole of isopropenyl acetate at a temperature within the range of from about 25° C. to about 80° C. in the presence of at least one acidic condensing agent present in amounts greater than 0.10 mole per mole of isopropenyl acetate, said acidic condensing agent being selected from the class consisting of hydrogen chloride, sulfuric acid, boron trifluoride, and zinc chloride.

7. The process for the production of 2,2-bis(4-hydroxyphenyl)propane which comprises maintaining a mixture of phenol and at least one acidic condensing agent selected from the class consisting of hydrogen chloride, sulfuric acid, boron trifluoride, and zinc chloride, at a temperature within the range of from about 25° C. to about 80° C. while slowly adding isopropenyl acetate to the mixture and recovering the 2,2-bis(4-hydroxyphenyl)propane thus produced by cooling the reaction mixture to a temperature below about 50° C., filtering off the crystalline material formed and washing the crystals with water to recover the crystalline 2,2-bis(4-hydroxyphenyl)propane.

8. The process for the production of 2,2-bis(4-hydroxyphenyl)propane which comprises maintaining a mixture of phenol and isopropenyl acetate in a molar ratio of at least two moles of phenol to one mole of isopropenyl acetate at a temperature within the range from about 25° C. to about 80° C., slowly adding at least one acidic condensing agent selected from the class consisting of hydrogen chloride, sulfuric acid, boron trifluoride, and zinc chloride, until at least 0.10 mole of said acidic condensing agent per mole of isopropenyl acetate has been added, and recovering the 2,2-bis(4-hydroxyphenyl)propane thus produced.

9. The process for the production of 2,2-bis(4-hydroxyphenyl)propane which comprises reacting phenol and isopropenyl acetate in a molar ratio of at least two moles of phenol per mole of isopropenyl acetate in the presence of at least 0.10 mole of hydrogen chloride per mole of isopropenyl acetate at a temperature within the range from about 25° C. to about 80° C., and recovering from the resultant mixture, the 2,2-bis(4-hydroxyphenyl)propane thus produced.

10. The process for the production of 2,2-bis(4-hydroxyphenyl)propane which comprises heating and reacting phenol and isopropenyl acetate at a temperature within the range of about 40° C. to about 70° C. in the presence of an aqueous acidic condensing agent wherein the acidic condensing agent is present in amounts of at least 0.10 mole per mole of isopropenyl acetate.

11. The process for the production of 2,2-bis(4-hydroxyphenyl)propane which comprises heating and reacting phenol and isopropenyl acetate at a temperature within the range of about 40° C. to about 70° C. in the presence of an aqueous hydrogen chloride containing at least 0.10 mole of hydrogen chloride per mole of isopropenyl acetate, said reactants being present in the molar ratio of at least two moles of phenol per mole of isopropenyl acetate.

References Cited in the file of this patent

UNITED STATES PATENTS

| | | |
|---|---|---|
| 1,977,627 | Greenhalgh | Oct. 23, 1934 |
| 2,422,016 | Hull et al. | June 10, 1947 |
| 2,653,979 | Kropa et al. | Sept. 29, 1953 |